US006958857B2

(12) United States Patent
Tsuzaki

(10) Patent No.: US 6,958,857 B2
(45) Date of Patent: Oct. 25, 2005

(54) OPTICAL FIBER COMPONENT FOR RAMAN AMPLIFICATION, RAMAN AMPLIFIER AND OPTICAL COMMUNICATIONS SYSTEM

(75) Inventor: Tetsufumi Tsuzaki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 296 days.

(21) Appl. No.: 10/608,024

(22) Filed: Jun. 30, 2003

(65) Prior Publication Data

US 2004/0008994 A1 Jan. 15, 2004

Related U.S. Application Data

(60) Provisional application No. 60/395,314, filed on Jul. 12, 2002.

(30) Foreign Application Priority Data

Oct. 10, 2002 (JP) ............................ P2002-297846

(51) Int. Cl.[7] ................................................ H01S 3/00
(52) U.S. Cl. ...................................... 359/334; 359/337
(58) Field of Search ................................. 359/334, 337

(56) References Cited

U.S. PATENT DOCUMENTS

| 6,819,477 B2 * | 11/2004 | Tsuzaki et al. ............. 359/334 |
| 6,862,132 B1 * | 3/2005 | Casaccia et al. ............ 359/334 |
| 6,876,489 B2 * | 4/2005 | Islam et al. ................. 359/334 |

OTHER PUBLICATIONS

Fludger, et al. "Electrical Measurements of Multipath Interference in Distributed Raman Amplifiers" Journal of Lightwave Technology vol. 19, No. 4 (Apr., 2001) pp. 536-545.
Lewis, et al. "Characterization of Double Rayleigh Scatter Noise in Raman Amplifiers" IEEE Photonic Technology Letters vol. 12, No. 5 (May, 2000) pp. 528-530.

* cited by examiner

*Primary Examiner*—Mark Hellner
(74) *Attorney, Agent, or Firm*—McDermott Will & Emery LLP

(57) ABSTRACT

The present invention relates to an optical fiber component for Raman amplification having a construction for effectively suppressing deterioration of the transmission characteristic caused by amplification of scattered light components. The optical fiber component for Raman amplification has an optical fiber for Raman amplification and is inserted at a position where the effective deterioration amount of the optical SN ratio produced by DRBS-XT (Double Rayleigh Back Scattering-Crosstalk) is 1 dB or less at the signal output terminal of the optical fiber for Raman amplification.

21 Claims, 6 Drawing Sheets

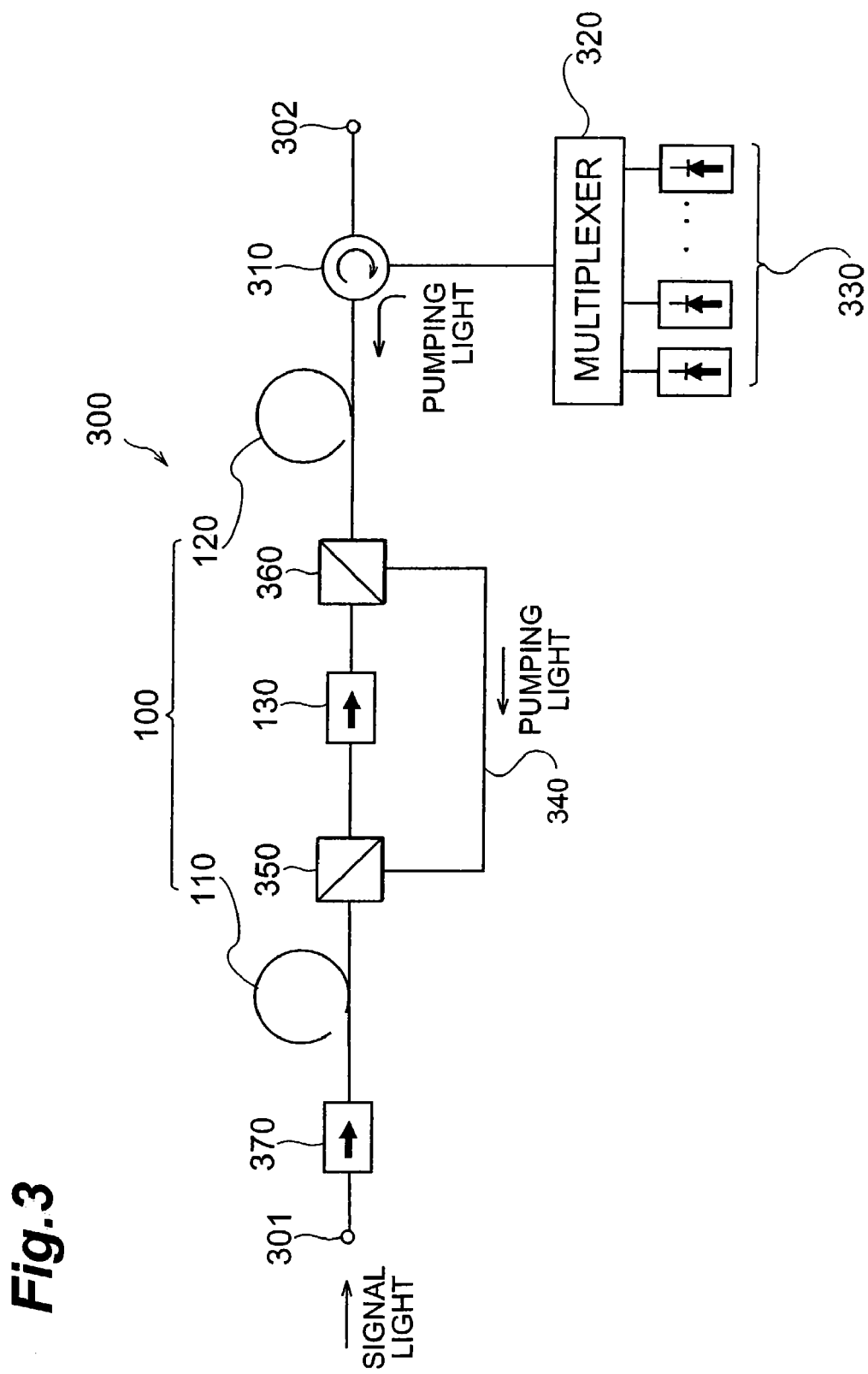

OPTICAL FIBER COMPONENT FOR RAMAN AMPLIFICATION, RAMAN AMPLIFIER AND OPTICAL COMMUNICATIONS SYSTEM

CROSS-REFERENCE TO RELATED APPLICATION

The application claims priority to Provisional Application Ser. No. 60/395,314 filed on Jul. 12, 2002, which is hereby incorporated by reference in its entirety.

BACKGROUND OF THE INVENTION

1. Field of the Invention

The present invention relates to an optical fiber component for Raman amplification, for Raman amplification of signal light of a plurality of channels having mutually different wavelengths, a Raman amplifier including the same and an optical communications system including the Raman amplifier.

2. Related Background Art

In an optical communications system in which communication is performed using signal light, the optical power of the signal light that is emitted from the transmitter is small when it arrives at the receiver, due to transmission loss while the signal light propagates along the optical transmission line. When optical power of the signal light reaching the receiver is below the predetermined value, reception errors are generated, with the result that normal optical communication cannot be performed. Accordingly, compensation of the transmission loss of the signal light in the optical transmission line is effected by providing an optical amplifier between the transmitter and receiver and amplifying the signal light by means of the optical amplifier.

Also, in a wavelength division multiplexing (WDM) optical communications system in which signal light of a plurality of channels having mutually different wavelengths are transmitted in multiplexed fashion, it is important to flatten the gain spectrum in the amplification wavelength band of the optical amplifier. The reason for this is that when the gain spectrum is not flat in the amplification wavelength band, there is a possibility that cases where reception is performed normally at the receiver for each signal channel and cases where reception errors occur may arise. In the case of a Raman amplifier, such flattening of the gain spectrum is achieved by suitably setting the respective amounts of power of the pumping light of the various channels that are supplied to the optical transmission line (the wavelengths of the pumping channels are mutually different).

SUMMARY OF THE INVENTION

By studying optical communications systems including prior art Raman amplifiers, the present inventors discovered the following problems. Specifically, scattered light components of various types are generated in Raman amplifiers or optical fibers for Raman amplification and it is possible for the transmission characteristics of the optical communications system as a whole to be adversely affected due to MPI crosstalk (see Multi-line Interference Crosstalk: Chris R. S, et al., IEEE Lightwave. Tech lett. Vol. 19, No. 4, April 2001) generated between these scattered light components and the signal light.

In particular, S. A. E. Lewis, et al., IEEE Photon. Tech lett. Vol. 12, No. 5 May 2000 focuses on DRBS-XT (Double Rayleigh Back Scattering-Crosstalk: crosstalk between the Rayleigh scattered light components propagate in the same direction as the signal light and the signal light) in such MPI crosstalk and describes measurement and evaluation of the DRBS-XT in single-stage and two-stage Raman amplifiers. However, this article does not show any specific means for avoiding the deterioration in transmission characteristics of the optical communications system as a whole caused by amplifying DRBS-XT.

The present invention has been accomplished in order to solve the problems as described above, and an object of the invention is to provide an optical fiber component for Raman amplification comprising a construction for effectively suppressing the deterioration in transmission characteristics caused by the amplification of various scattered light components generated in an optical fiber for Raman amplification or a Raman amplifier, a Raman amplifier including the optical fiber component and an optical communications system including the Raman amplifier.

In order to achieve the above object, an optical fiber component for Raman amplification according to the present invention comprises an optical fiber for Raman amplification and an attenuation device arranged in a position separated by a predetermined distance from the signal output terminal of the optical fiber for Raman amplification. In such an optical fiber for Raman amplification, Raman amplification is effected by supplying light (including one or more pumping channels) that pumps the signal light of a plurality of channels of mutually different wavelength. The attenuation device is a device that selectively attenuates the light that propagates in the opposite direction to the signal light by 10 dB or more, and is inserted at a position at which the effective deterioration amount of the optical SN ratio produced by DRBS-XT (Double Rayleigh Back Scattering-Crosstalk) is 1 dB or less, at the signal output terminal of the above optical fiber for Raman amplification.

Specifically, the above device is arranged at a position on the optical fiber for Raman amplification where the absolute value |MPI-XT| of the MPI (Multi-Line Interference) crosstalk at the signal output terminal of the optical fiber for Raman amplification and the optical SN ratio OSNR satisfy the expression (1) below.

$$0 \leq \log((|\text{MPI-XT}|+\text{OSNR})/|\text{MPI-XT}|) \leq 0.1 \quad (1)$$

In particular, in order to suppress amplification of DRBS-XT (Double Rayleigh Back Scattering-Crosstalk), of the above-mentioned MPI crosstalk, in an optical fiber component for Raman amplification according to the present invention, preferably the attenuation device is arranged at a position on the optical fiber for Raman amplification at which the absolute value |DRBS-XT| of the DRBS-XT at the signal output terminal of the optical fiber for Raman amplification and the optical SN ratio OSNR satisfy the following expression (2).

$$0 \leq \log((|\text{DRBS-XT}|+\text{OSNR})/|\text{DRBS-XT}|) \leq 0.1 \quad (2)$$

With such an optical fiber for the Raman amplification, by arranging the attenuation device at a position separated from the signal output terminal of the optical fiber for Raman amplification by a predetermined distance so as to satisfy the above expression (1) or expression (2), the cause of deterioration of the transmission characteristic created by the amplification of the scattered light components generated in the optical fiber for Raman amplification or in the Raman amplifier including the optical fiber for Raman amplification is effectively eliminated.

Preferably, when the effective length of the optical fiber for Raman amplification at the wavelength of the pumping light is taken as 1, the above attenuation device is arranged at a position, separated by a predetermined distance from the position of input of the pumping light, at which the effective length seen from the input position becomes 0.4 to 0.6. Also, when the gain obtained in the optical fiber for Raman amplification as a whole is taken as 1, the attenuation device may be arranged at a position, separated by a predetermined distance from the signal input terminal, where a gain of 0.4 to 0.6 can be obtained in the gain distribution along the direction of elongation of the optical fiber for Raman amplification.

A Raman amplifier according to the present invention includes an optical fiber for Raman amplification having a construction as described above. Furthermore, the Raman amplifier comprises a light source of pumping light and a pumping light multiplexing structure. The pumping light source supplies to the optical fiber for Raman amplification pumping light for generating Raman gain in a predetermined wavelength band. Also, the multiplexing structure guides the pumping light from the pumping light source into the optical fiber for Raman amplification.

Also, in a Raman amplifier according to the present invention, preferably the ratio $g_R/A_{eff}$ of the Raman gain coefficient $g_R$ with respect to the effective area $A_{eff}$ of the optical fiber for Raman amplification is 5 (1/Wkm) or more with respect to the pumping light wavelength. This is because, when the ratio $g_R/A_{eff}$ is 5 (1/Wkm) or more, the optical fiber for Raman amplification may be shortened, so deterioration of transmission characteristics caused by amplification of the signal light reflected within the optical fiber for Raman amplification is effectively suppressed.

An optical communications system according to the present invention comprises a transmitter that emits signals of a plurality of channels having mutually different wavelengths onto an optical transmission line, a receiver that receives the signal light propagating through the optical transmission line and a Raman amplifier as described above arranged in the optical transmission line of the transmitter and receiver.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a view showing the construction of a second embodiment in a Raman amplifier according to the present invention;

DESCRIPTION OF THE PREFERRED EMBODIMENTS

Embodiments of an optical fiber component for Raman amplification, a Raman amplifier and an optical communications system according to the present invention are described below with reference to FIGS. 1 to 3, 4A to 5B and 6. In the description of the drawings, repetition of description is avoided by attaching the same reference symbols to similar items.

Figure 1:
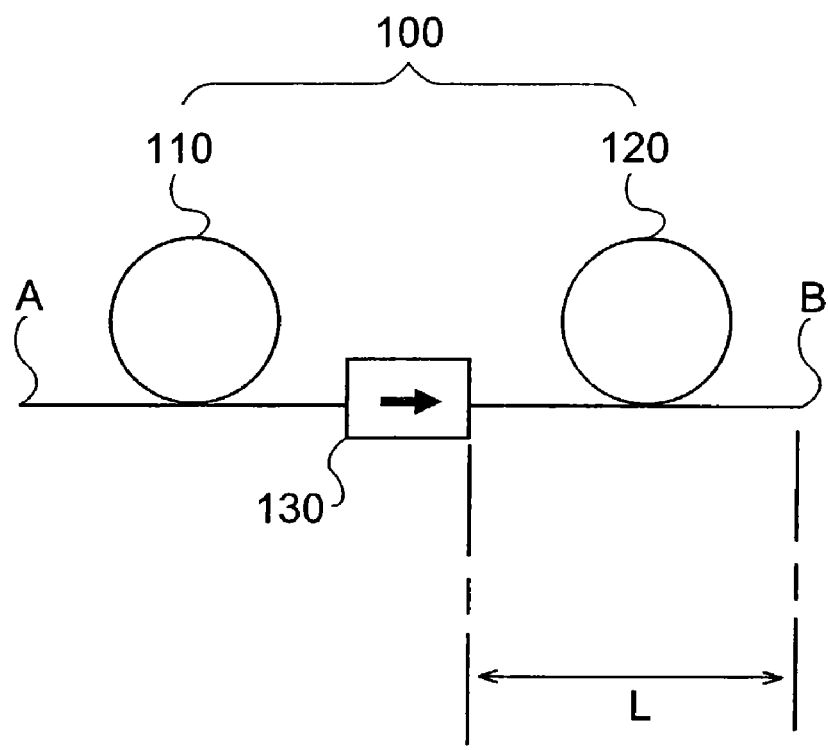
FIG. 1 is a view showing a construction of an embodiment of an optical fiber component for Raman amplification according to the present invention.

FIG. 1 is a view showing the construction of an embodiment of an optical fiber component for Raman amplification according to the present invention. As shown in FIG. 1, an optical fiber component for Raman amplification according to the present invention comprises an optical fiber for Raman amplification 100 having a signal input terminal A and signal output terminal B. An attenuation device 130 is arranged in a position separated from the signal output terminal B of the optical fiber for Raman amplification 100 by a distance L, between an upstream optical fiber 110 and downstream optical fiber 120 constituting the optical fiber for Raman amplification 100. In particular, the attenuation device 130 is an optical component that selectively attenuates by 10 dB or more light that propagates from the signal output terminal B towards the signal input terminal A of the optical fiber for Raman amplification 100 (light propagating in the opposite direction to the signal light). In this embodiment, an optical isolator is employed that passes light propagating from the signal input terminal A towards the signal output terminal B but cuts off light propagating in the opposite direction.

Specifically, at the position where the attenuation device 130 is arranged, separated by a distance L from the signal output terminal B of the optical fiber for Raman amplification 100, the absolute value |MPI-XT| of the MPI (multi-line interference) crosstalk at the signal output terminal B of the optical fiber for Raman amplification 100 and the optical SN ratio OSNR satisfy the following expression (3).

$$0 \leq \log((|MPI\text{-}XT|+OSNR)/|MPI\text{-}XT|) \leq 0.1 \qquad (3)$$

In particular, of the above MPI crosstalk, in order to suppress amplification of the DRBS-XT (Double Rayleigh Back Scattering-crosstalk), the absolute value |DRBS-XT| of the DRBS-XT at the signal output terminal B of the optical fiber for Raman amplification 100 and the optical SN ratio OSNR are satisfy the following expression (4)

$$0 \leq \log((|DRBS\text{-}XT|+OSNR)/|DRBS\text{-}XT|) \leq 0.1 \qquad (4)$$

It should be noted that, when the effective length at the wavelength of the pumping light supplied to the optical fiber for Raman amplification 100 is taken to be 1, preferably the attenuation device 130 is arranged at a position separated by a predetermined distance from the input terminal of the pumping light, at which the effective length seen from the input position is 0.4 to 0.6. Also, when the gain obtained by the optical fiber for Raman amplification 100 taken as a whole is taken to be 1, the attenuation device 130 may be arranged at a position, separated by a predetermined distance from the signal light input terminal A, where a gain of 0.4 to 0.6 in the gain distribution along the longitudinal direction of the optical fiber for Raman amplification 100 is obtained.

Figure 2:
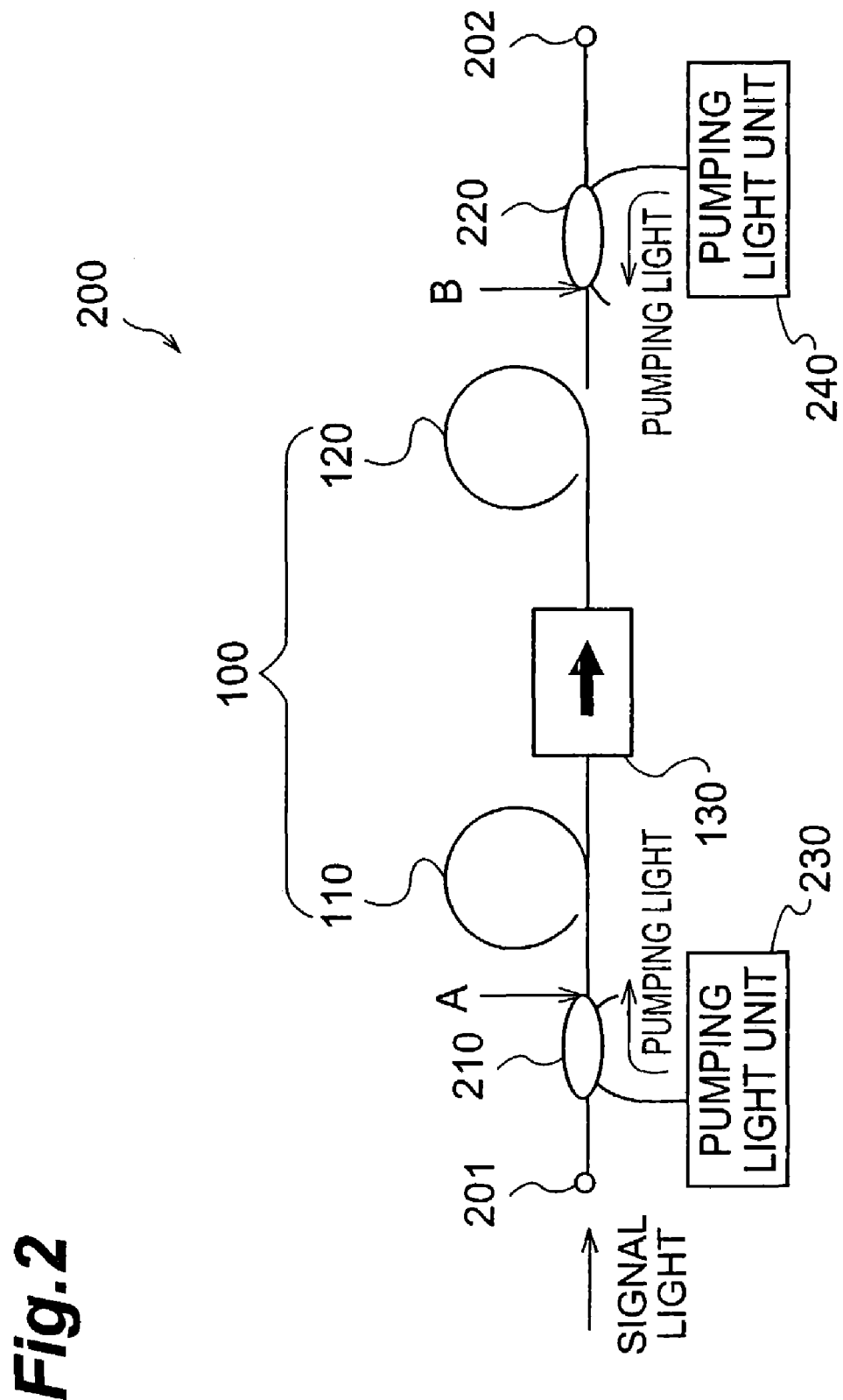
FIG. 2 is a view showing the construction of a first embodiment in a Raman amplifier according to the present invention.

FIG. 2 is a view showing the construction of a first embodiment of a Raman amplifier according to the present invention. The Raman amplifier 200 according to this first embodiment is a bi-directional pumping type Raman amplifier including an optical fiber component (FIG. 1) for Raman amplification as described above and capable of Raman amplification by supplying pumping light respectively to an upstream optical fiber 110 and downstream optical fiber 120 separated by an attenuation device 130 (for example an optical isolator).

The Raman amplifier 200 according to this first embodiment comprises a pumping light unit 230 for forward pumping, a pumping light unit 240 for backward pumping, a multiplexer 210 for guiding the pumping light from the pumping light unit 230 for forward pumping into the upstream optical fiber 110 and a multiplexer 220 for guiding pumping light from the pumping light unit 240 for backward pumping into the downstream optical fiber 120. The signal light that is introduced from the input terminal 201 of the Raman amplifier 200 is subjected to Raman amplification in the upstream optical fiber 110 before passing through the attenuation device 130. The signal light that has passed through the attenuation device 130 then arrives at the downstream optical fiber 120, where it is again subjected to Raman amplification. The signal light that has thus been subjected to two-stage Raman amplification is then output to the optical transmission line from the output terminal 202 of the Raman amplifier 200.

FIG. 3 is a view showing the construction of a second embodiment of a Raman amplifier according to the present invention. The Raman amplifier 300 according to a second embodiment is a backward pumping type Raman amplifier in which pumping light supplied to the downstream optical fiber 120 is guided to the upstream optical fiber 110 so as to make possible two-stage Raman amplification in the same way as in the first embodiment described above and is provided with a bypass circuit 340 for guiding pumping light propagating through the downstream optical fiber 120 to the upstream optical fiber 110 without passing through the attenuation device 130.

The Raman amplifier 300 according to this second embodiment comprises a pumping light unit for supplying pumping light to the downstream optical fiber 120, an optical isolator 370 arranged between the signal input terminal of the optical fiber for Raman amplification 100 (comprising the upstream optical fiber 110 and downstream optical fiber 120, with the attenuation device 130 arranged therebetween) and the input terminal 301 and an optical circulator 310 that guides the pumping light (a plurality of channels) from the pumping light unit into the optical fiber for Raman amplification 100 and for guiding the signal light that is subjected to Raman amplification in the optical fiber for Raman amplification 100 to an output terminal 302. The pumping light unit comprises a plurality of pumping light sources 330 that output pumping light of mutually different wavelengths and a multiplexer 320 for multiplexing the pumping light from these pumping light sources 330 and guiding the multiplexed pumping light to the optical circulator 310.

The Raman amplifier 300 according to this second embodiment further comprises a wavelength demultiplexer 360 for guiding the pumping light supplied to the downstream optical fiber 120 constituting part of the optical fiber for Raman amplification 100 to the upstream fiber 110 without passing through the attenuation device 130, a wavelength multiplexer 350 and a bypass circuit (optical fiber) 340 connecting the multiplexer and demultiplexer 350 and 360 for guiding the pumping light from the downstream optical fiber 120 to the upstream optical fiber 110.

Figure 4A:
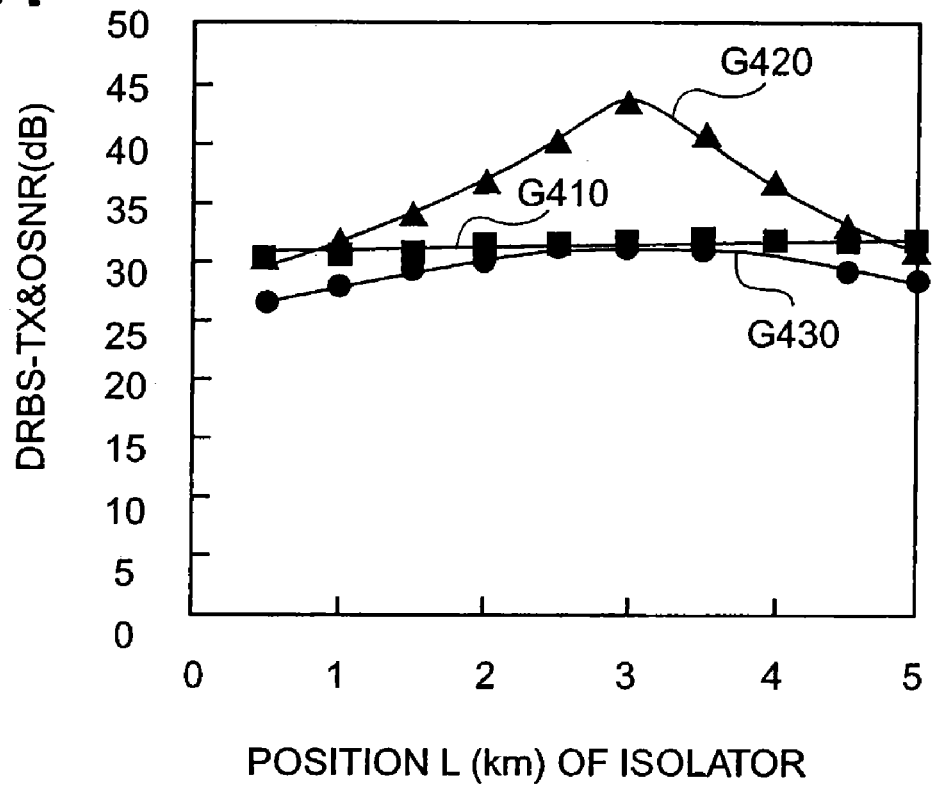
FIGS. 4A and 4B are graphs relating to an optical fiber for Raman amplification of length 5 km respectively showing the relationship between the position of insertion of an attenuation device and DRBS-XT and the relationship between the position in which the attenuation device is inserted and the pumping light power obtained with a gain of 15 dB.
Figure 4B:
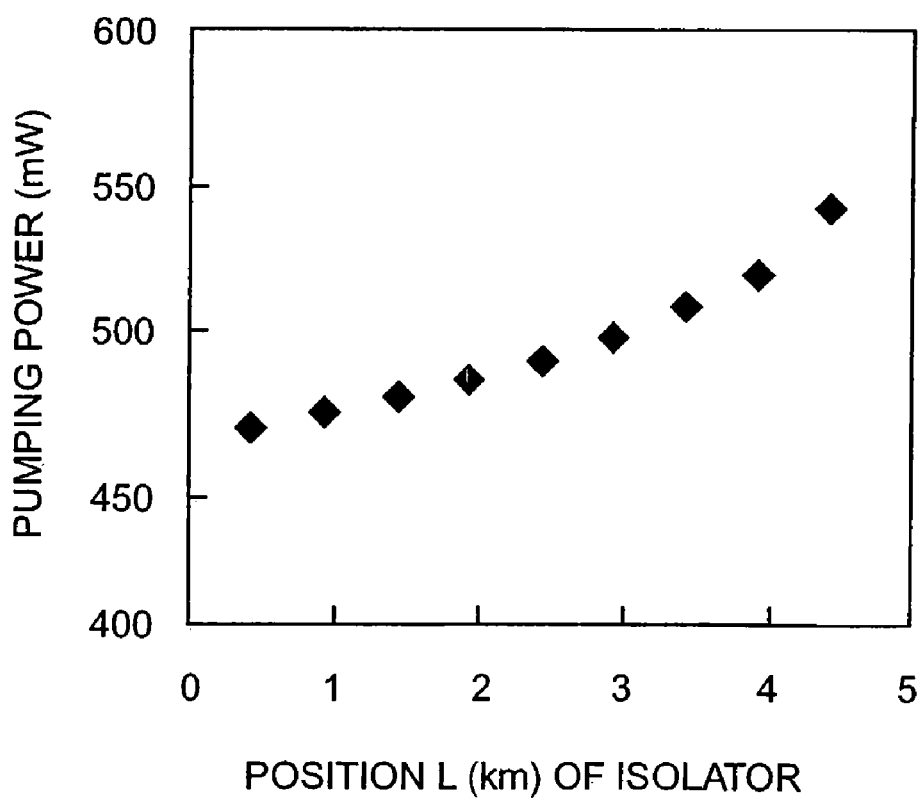
Figure 5A:
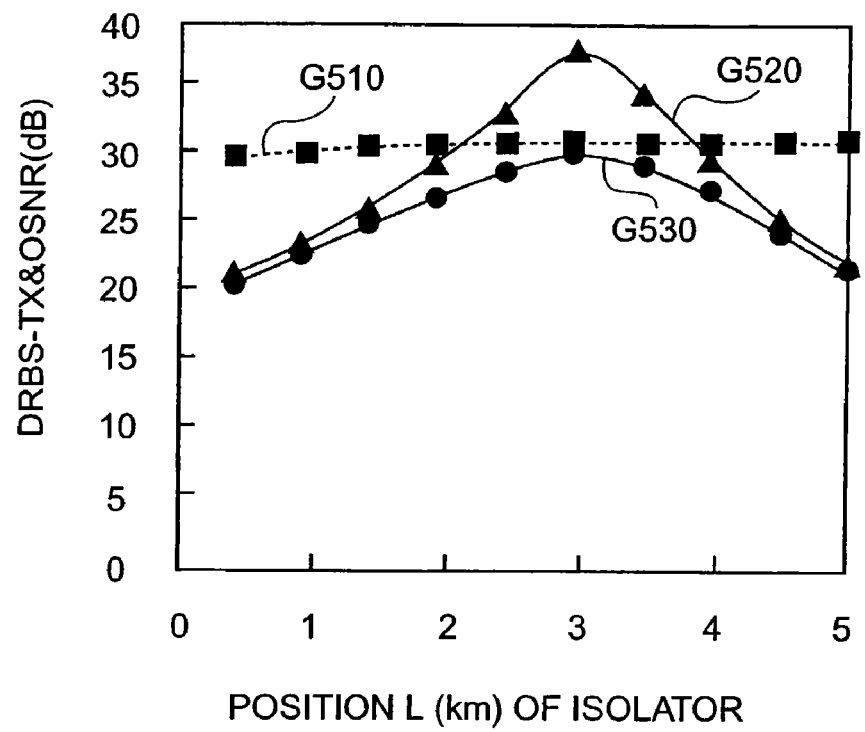
FIGS. 5A and 5B are graphs relating to an optical fiber for Raman amplification of length 5 km respectively showing the relationship between the position of insertion of an attenuation device and DRBS-XT and the relationship between the position in which the attenuation device is inserted and the pumping light power obtained with a gain of 20 dB.
Figure 5B:
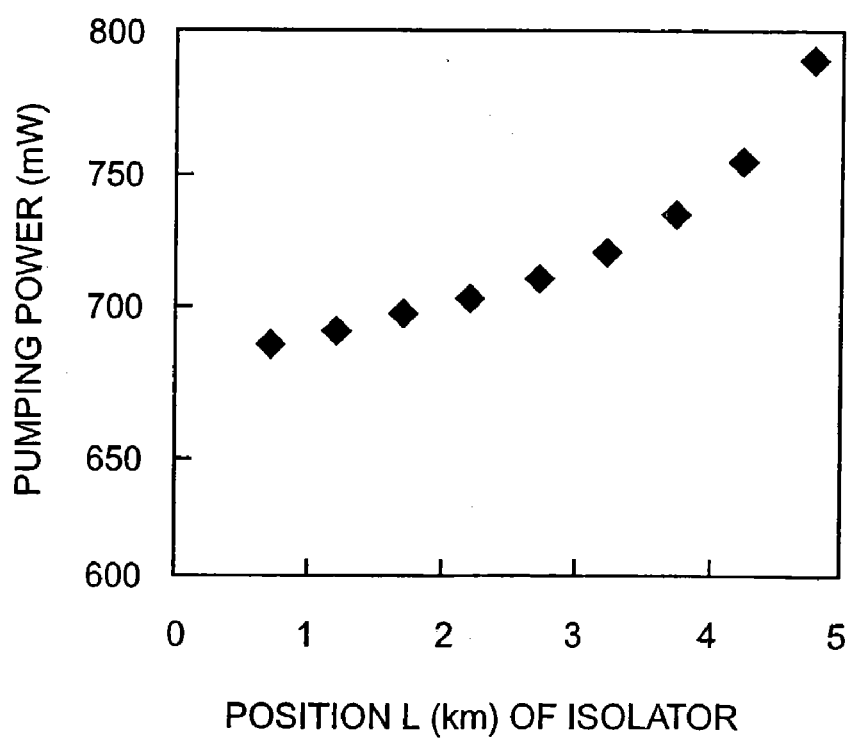

FIGS. 4A and 4B are graphs relating to an optical fiber for Raman amplification 100 of length 5 km respectively showing the relationship between the position of insertion of an attenuation device 130 and DRBS-XT (FIG. 4A) and the relationship between the position in which the attenuation device 130 is inserted and the pumping light power obtained with a gain of 15 dB (FIG. 4B). In FIG. 4A, graph G410 shows the measured values of the optical SN ratio, graph G420 shows the measured values of the DRBS-XT and graph G430 shows the measured values of the effective optical SN ratio at the signal light output terminal. FIGS. 5A and 5B are graphs relating to an optical fiber for Raman amplification 100 of length 5 km respectively showing the relationship between the position of insertion of an attenuation device 130 and DRBS-XT (FIG. 5A) and the relationship between the position in which the attenuation device 130 is inserted and the pumping light power obtained with a gain of 20 dB (FIG. 5B). In FIG. 5A, graph G510 shows the measured values of the optical SN ratio, graph G520 shows the measured values of the DRBS-XT and graph G530 shows the measured values of the effective optical SN ratio at the signal light output terminal.

As can be seen from these FIGS. 4A and 5A, the DRBS-XT amount takes a maximum value depending on the position of insertion of the attenuation device 130 that selectively attenuates the light that propagates in the opposite direction to the signal light by an amount of 10 dB or more. Specifically, when the attenuation device 130 is inserted at a position at which the relationship of the absolute value IDRBS-XTI of DRBS-XT at the signal output terminal B of the optical fiber for Raman amplification 100 and the optical SN ratio OSNR at the signal output terminal B satisfies expression (4), the deterioration amount of the optical SN ratio of the effective optical SN ratio $OSNR_{eff}$ taking into account the effective deterioration amount of the optical SN ratio produced by DRBS-XT becomes 1 dB or less. This means deterioration of the transmission characteristic in the optical communications system where the Raman amplifier is applied can be effectively suppressed.

It should be noted that when the effective length of the optical fiber for Raman amplification 100 at the wavelength of the pumping light is assumed to be 1, deterioration of the transmission characteristic is effectively suppressed even if the attenuation device 130 that is inserted in the optical fiber for Raman amplification 100 is arranged at a position separated by a predetermined distance from the input position of the pumping light in the optical fiber for Raman amplification 100 at which the effective length seen from the input position is 0.4 to 0.6. In this case, in FIGS. 4A and 5A respectively, the position of insertion of the attenuation device 130 is in the range 2950 m to 3635 m.

Also, the deterioration of the transmission characteristic in the optical communications system can likewise be effectively suppressed even if the attenuation device 130 that is inserted into the optical fiber for Raman amplification 100 is arranged at a position that is separated by a predetermined distance from input position of the signal light at which a gain of 0.4 to 0.6 in the gain distribution along the longitudinal direction of the optical fiber for Raman amplification 100 is obtained, when the gain obtained by the optical fiber for Raman amplification 100 as a whole is taken as 1. In this case, the position of insertion of the attenuation device 130 In FIG. 4A in is in the range 2450 m to 3450 m. In FIG. 5A, the position of insertion of the attenuation device 130 is in the range 2400 m to 3400 m.

Preferably, the ratio $g_R/A_{eff}$ of the Raman gain coefficient $g_R$ with respect to the effective area $A_{eff}$ of the optical fiber for Raman amplification 100 is 5 (1/Wkm) or more with respect to the wavelength of the pumping light. This is because, when the ratio $g_R/A_{eff}$ is 5 (1/Wkm) or more, the optical fiber for Raman amplification 100 may itself be shortened, so deterioration of transmission characteristics caused by amplification of the signal light reflected within the optical fiber for Raman amplification 100 is effectively suppressed (the occurrence of DRBS-XT itself is suppressed).

Figure 6:
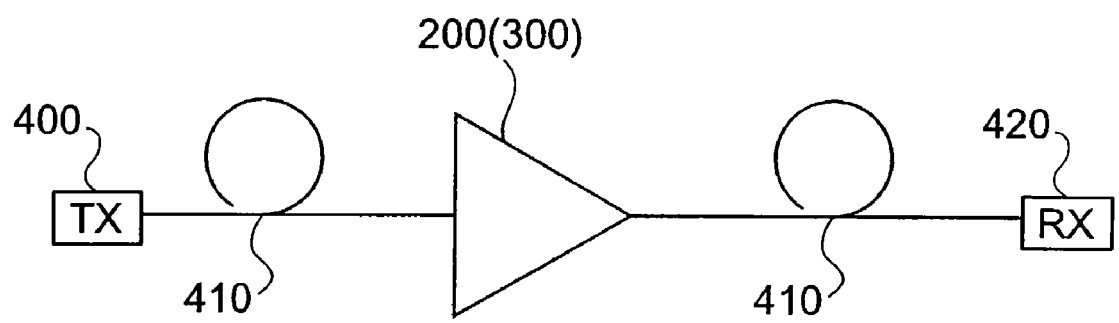
FIG. 6 is a view showing the construction of an optical communications system according to the present invention.

FIG. 6 is a view showing the construction of an optical communications system according to the present invention. As shown in FIG. 6, the optical communications system comprises a transmitter (TX) 400 for transmitting to an optical transmission line 410 signal light (WDM signals) of a plurality of channels of mutually different wavelength and a receiver (RX) 420 for receiving the signal light propagating through the optical transmission line 410 and further comprises a Raman amplifier 200 (300) having a construction as described above, arranged in the optical transmission line 410 between the transmitter 400 and receiver 420.

In the optical communications system shown in FIG. 6, deterioration of the transmission characteristic caused by generation of scattered light components such as DRBS-XT is effectively suppressed by use of a Raman amplifier 200 (300) having a construction as described above.

As described above, with the present invention, an attenuator that selectively attenuates light propagating in the opposite direction to the signal light by an amount of 10 dB or more is arranged at a position where the effective deterioration amount of the optical SN ratio produced by DRBS-XT (Double Rayleigh Back Scattering-Crosstalk) at the signal output terminal of the optical fiber for Raman amplification is 1 dB or less, in other words, a position on the optical fiber for Raman amplification at which the absolute value |MPI-XT| of the MPI (multi-line interference) crosstalk at the signal output terminal of the optical fiber for Raman amplification and the optical SN ratio OSNR, or the absolute value |DRBS-XT| of the DRBS-XT and the optical SN ratio OSNR satisfy expression (3) or expression (4) above. In this way, the benefit is obtained that the cause of deterioration of the transmission characteristic produced by amplification of the scattered light components generated in an optical fiber for Raman amplification or in a Raman amplifier including the optical fiber for Raman amplification is effectively eliminated.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber component for Raman amplification, comprising:
    an optical fiber for Raman-amplifying signal light of a plurality of channels of mutually different wavelengths; and
    a device, inserted at a predetermined position in said optical fiber for Raman amplification, selectively attenuating by 10 dB or more light that propagates in an opposite direction to the signal light,
    wherein said device is inserted at a position where an effective deterioration amount of an optical SN ratio produced by DRBS-XT (Double Rayleigh Back Scattering-Crosstalk), at a signal output terminal of said optical fiber for Raman amplification, becomes 1 dB or less.

2. An optical fiber component for Raman amplification according to claim 1, wherein, when an effective length of said optical fiber for Raman amplification at a wavelength of pumping light is taken as 1, said device is arranged at a position separated by a predetermined distance from an input position of the pumping light such that the effective length seen from the input position becomes 0.4 to 0.6.

3. An optical fiber component for Raman amplification according to claim 1, wherein, when a gain obtained by said optical fiber for Raman amplification as a whole is taken as 1, said device is arranged at a position separated by a predetermined distance from a signal input terminal such that a gain of 0.4 to 0.6 can be obtained in a gain distribution along a longitudinal direction of said optical fiber for Raman amplification.

4. A Raman amplifier including an optical fiber component for Raman amplification according to claim 1.

5. A Raman amplifier according to claim 4, further comprising:
    a pumping light source for supplying pumping light for generating Raman gain in a predetermined wavelength band in said optical fiber for Raman amplification; and
    a multiplexing structure for guiding the pumping light from said pumping light source into said optical fiber for Raman amplification.

6. A Raman amplifier according to claim 4, wherein, when a Raman gain coefficient of said optical fiber for Raman amplification is taken as $g_R$ and an effective area is taken as $A_{eff}$, a ratio $g_R/A_{eff}$ of the Raman coefficient with respect to the effective area of said optical fiber for Raman amplification at a wavelength of pumping light is 5 (1/Wkm) or more.

7. An optical communications system including a Raman amplifier according to claim 4.

8. An optical fiber component for Raman amplification, comprising:
    an optical fiber for Raman-amplifying signal light of a plurality of channels of mutually different wavelengths; and
    a device, inserted at a predetermined position in said optical fiber for Raman amplification, selectively attenuating by 10 dB or more light that propagates in an opposite direction to the signal light,
    wherein said device is inserted at a position where an absolute value |MPI-XT| of MPI (Multi-Line Interference) crosstalk at a signal output terminal of said optical fiber for Raman amplification and an optical SN ratio OSNR satisfy the condition:

$$0 \leq \log((|MPI-XT|+OSNR)/|MPI-XT|) \leq 0.1$$

9. An optical fiber component for Raman amplification according to claim 8, wherein, when an effective length of said optical fiber for Raman amplification at a wavelength of pumping light is taken as 1, said device is arranged at a position separated by a predetermined distance from an input position of the pumping light such that the effective length seen from the input position becomes 0.4 to 0.6.

10. An optical fiber component for Raman amplification according to claim 8, wherein, when a gain obtained by said optical fiber for Raman amplification as a whole is taken as 1, said device is arranged at a position separated by a predetermined distance from a signal input terminal such that a gain of 0.4 to 0.6 can be obtained in a gain distribution along a longitudinal direction of said optical fiber for Raman amplification.

11. A Raman amplifier including an optical fiber component for Raman amplification according to claim 8.

12. A Raman amplifier according to claim 11, further comprising:
a pumping light source for supplying pumping light for generating Raman gain in a predetermined wavelength band in said optical fiber for Raman amplification; and
a multiplexing structure for guiding the pumping light from said pumping light source into said optical fiber for Raman amplification.

13. A Raman amplifier according to claim 11, wherein, when a Raman gain coefficient of said optical fiber for Raman amplification is taken as $g_R$ and an effective area is taken as $A_{\it eff}$, a ratio $g_R/A_{\it eff}$ of the Raman coefficient with respect to the effective area of said optical fiber for Raman amplification at a wavelength of pumping light becomes 5 (1/Wkm) or more.

14. An optical communications system including a Raman amplifier according to claim 11.

15. An optical fiber component for Raman amplification, comprising:
an optical fiber for Raman-amplifying signal light of a plurality of channels of mutually different wavelengths; and
a device, inserted at a predetermined position in said optical fiber for Raman amplification, selectively attenuating by 10 dB or more light that propagates in an opposite direction to the signal light,
wherein said device is inserted at a position where an absolute value |DRBS-XT| of DRBS-XT (Double Rayleigh Back Scattering-Crosstalk) at a signal output terminal of said optical fiber for Raman amplification and an optical SN ratio OSNR satisfy the following condition:

$$0 \leq \log((|DRBS\text{-}XT|+OSNR)/|DRBS\text{-}XT|) \leq 0.1.$$

16. An optical fiber component for Raman amplification according to claim 15, wherein, when an effective length of said optical fiber for Raman amplification at a wavelength of pumping light is taken as 1, said device is arranged at a position separated by a predetermined distance from an input position of the pumping light such that the effective length seen from the input position becomes 0.4 to 0.6.

17. An optical fiber component for Raman amplification according to claim 15, wherein, when a gain obtained by said optical fiber for Raman amplification as a whole is taken as 1, said device is arranged at a position separated by a predetermined distance from a signal input terminal such that a gain of 0.4 to 0.6 can be obtained in a gain distribution along a longitudinal direction of said optical fiber for Raman amplification.

18. A Raman amplifier including an optical fiber component for Raman amplification according to claim 15.

19. A Raman amplifier according to claim 18, further comprising:
a pumping light source for supplying pumping light for generating Raman gain in a predetermined wavelength band in said optical fiber for Raman amplification; and
a multiplexing structure for guiding the pumping light from said pumping light source into said optical fiber for Raman amplification.

20. A Raman amplifier according to claim 18, wherein, when a Raman gain coefficient of said optical fiber for Raman amplification is taken as $g_R$ and an effective area is taken as $A_{\it eff}$, a ratio $g_R/A_{\it eff}$ of the Raman coefficient with respect to the effective area of said optical fiber for Raman amplification at a wavelength of pumping light is 5 (1/Wkm) or more.

21. An optical communications system including a Raman amplifier according to claim 18.

* * * * *